(12) United States Patent
Hu et al.

(10) Patent No.: US 11,165,706 B2
(45) Date of Patent: Nov. 2, 2021

(54) METHOD OF CROSS-LAYER OPPORTUNISTIC ROUTING FOR INTERNET OF VEHICLES BASED ON DECENTRALIZED CONGESTION CONTROL STRATEGY

(71) Applicant: SOUTH CHINA UNIVERSITY OF TECHNOLOGY, Guangdong (CN)

(72) Inventors: Binjie Hu, Guangdong (CN); Tao Zhang, Guangdong (CN); Jiayuan Du, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 182 days.

(21) Appl. No.: 16/616,495

(22) PCT Filed: Nov. 30, 2017

(86) PCT No.: PCT/CN2017/113845
§ 371 (c)(1),
(2) Date: Nov. 25, 2019

(87) PCT Pub. No.: WO2018/218904
PCT Pub. Date: Dec. 6, 2018

(65) Prior Publication Data
US 2021/0168077 A1  Jun. 3, 2021

(30) Foreign Application Priority Data
May 31, 2017 (CN) .......................... 201710401241.0

(51) Int. Cl.
*H04L 12/803* (2013.01)
*H04L 12/801* (2013.01)
*H04L 29/08* (2006.01)

(52) U.S. Cl.
CPC ............ *H04L 47/125* (2013.01); *H04L 47/29* (2013.01); *H04L 67/12* (2013.01); *H04L 67/142* (2013.01)

(58) Field of Classification Search
CPC ....... H04L 47/125; H04L 47/29; H04L 67/12; H04L 67/142
See application file for complete search history.

(56) References Cited

U.S. PATENT DOCUMENTS

2013/0190025 A1* 7/2013 Sakata ................ H04W 52/343
455/501
2013/0336120 A1* 12/2013 Bai ........................ G08G 1/161
370/235

(Continued)

FOREIGN PATENT DOCUMENTS

| CN | 103209434 | 7/2013 |
|---|---|---|
| CN | 105847177 | 8/2016 |
| CN | 107171965 | 9/2017 |

OTHER PUBLICATIONS

"International Search Report (Form PCT/ISA/210) of PCT/CN2017/113845", dated Jan. 4, 2018, with English translation thereof, pp. 1-4.

*Primary Examiner* — Michael A Keller
*Assistant Examiner* — Jsing Forng Lin
(74) *Attorney, Agent, or Firm* — JCIPRNET

(57) ABSTRACT

A method of cross-layer opportunistic routing for Internet of Vehicles based on decentralized congestion control strategy includes the following steps. Design a multi-state decentralized congestion control state machine. Record, by each vehicle, a current state value, and calculate a medium access control layer channel load (CL) and an average state value (AS) of all neighbor nodes. Adaptively adjust the current state machine in combination with relationships between a CL statistical value and a preset threshold and between the (Continued)

s and the AS, thereby controlling a transmit power, a transmit data rate and a receiver sensitivity of Cooperative Awareness Message (CAM) and routing message. Utilize, by the vehicle node, CAM to update state information of the neighbor nodes in real time, and select to perform greedy forwarding or opportunistic forwarding of routing message according to location relationships among the vehicle node, the neighbor nodes and a target node.

4 Claims, 5 Drawing Sheets

(56) References Cited

U.S. PATENT DOCUMENTS

| | | | |
|---|---|---|---|
| 2015/0156662 A1* | 6/2015 | Bai | H04W 28/0236 |
| | | | 370/231 |
| 2015/0327028 A1* | 11/2015 | Zhang | H04W 4/46 |
| | | | 455/452.1 |
| 2017/0061789 A1* | 3/2017 | Jeng | G08G 1/091 |
| 2018/0310200 A1* | 10/2018 | Buburuzan | H04W 28/0205 |

\* cited by examiner

METHOD OF CROSS-LAYER OPPORTUNISTIC ROUTING FOR INTERNET OF VEHICLES BASED ON DECENTRALIZED CONGESTION CONTROL STRATEGY

CROSS-REFERENCE TO RELATED APPLICATION

This application is a 371 of international application of PCT application serial no. PCT/CN2017/113845, filed on Nov. 30, 2017, which claims the priority benefit of China application no. 201710401241.0, filed on May 31, 2017. The entirety of each of the above mentioned patent applications is hereby incorporated by reference herein and made a part of this specification.

TECHNICAL FIELD

The present invention belongs to the field of communication technologies of Internet of Vehicles, and mainly relates to a method of cross-layer opportunistic routing for Internet of Vehicles based on decentralized congestion control strategy, which can be used for fair and reliable transmission of safety information and congestion control of routing protocol for Internet of Vehicles.

BACKGROUND

Internet of Vehicles has become an important part of intelligent transportation and intelligent driving, because it can sense the surrounding traffic environment in real time and realize real-time information interaction among surrounding vehicles, road facilities and pedestrians. However, under the effects of factors such as high-speed movement of vehicle nodes and rapid changes of network topology, it is difficult to maintain a stable communication link in Vehicular Ad Hoc Network. With the continuous maturity of Vehicular Ad Hoc Network and the continuous development of vehicular opportunistic routing protocol, researchers have improved the vehicular opportunistic routing protocol based on geographic information. The performance of the vehicular opportunistic routing protocol depends on underlying protocols (MAC layer and PHY layer), and routing decision depends on the acquired auxiliary information. In order to select an appropriate forwarding time and relay nodes, and improve packet delivery ratio, real-time interaction of vehicle state information is required between the vehicle nodes, so that serious communication load is easily caused. Limited by wireless channel resources, underlying characteristics must be considered in the design of the vehicular opportunistic routing protocol. However, many researches have ignored the limitation of the underlying protocol, especially in urban scenes with high traffic density. At present, the existing vehicle nodes broadcast periodic safety information is generally spreading messages to the maximum extent, due to the congestion of traffic and network, periodic broadcasting of the safety information is easy to cause long-time random backoff waiting and packet dropping of the safety information. This is very disadvantageous to update the state information of relay vehicle nodes and target vehicle nodes in an opportunistic routing process, and the real-time performance is poor, which is easy to cause misjudgment of the routing decision.

As the first standard specially designed for road communication, IEEE 802.11p MAC has the main disadvantages of poor performance when channel load is heavy, such as low reliability, hidden node, infinite delay and intermittent V2I connectivity. The decentralized congestion control method can enhance the performance of IEEE 802.11p MAC.

SUMMARY

The present invention is intended to overcome the defects of the vehicular opportunistic routing protocol and the IEEE 802.11p MAC described above, and provides a method of cross-layer opportunistic routing for Internet of Vehicles based on decentralized congestion control strategy, so as to alleviate channel congestion, and realize reliable transmission of safety information and improve the delivery ratio of routing message for Internet of Vehicles under different traffic densities.

In order to achieve the object above, a method of cross-layer opportunistic routing for Internet of Vehicles based on decentralized congestion control strategy according to the present invention comprises the following steps of:

(1) designing a multi-state decentralized congestion control state machine: wherein the multi-state decentralized congestion control state machine has eight states (s), which are recorded as Relaxed ("0"), Active ("1 to 6") and Restrictive ("7") in sequence, state values are 0 to 7, a transmit power, a transmit data rate and a receiver sensitivity are set for each state, the higher the state value is, the lower the transmit power and the receiver sensitivity are, and the higher the transmit data rate is;

(2) recording, by a vehicle node, a current state value s (s=0 during initialization), and calculating a channel load CL (1s) of a medium access control layer (MAC layer), and an average state value AS of all neighbor nodes thereof at a time interval period of 1 s;

(3) updating, by the vehicle node, the state machine according to the CL (1s), the s and the AS:

wherein CL(s→s+1) denotes a channel load threshold in a transition condition from the state s to a state s+1, CL(s→s−1) denotes a channel load threshold in a transition condition from the state s to a state s−1, min(s,k) denotes the minimum value of s and k, max(s,k) denotes the maximum value of s and k, and a counter Time is initialized as 0;

3.1) initializing a state of the state machine as Relaxed ("0"), and the counter Time as 0;

3.2) triggering to calculate the channel load CL (1s) and the average state value AS per second, and recording the current state value s;

3.3) if CL(1s)≥CL(s→s+1) and s<AS are both met at the same time, setting the Time as 0, performing state transition, and taking the value of s as min(s+1,7); if CL(1s)≥CL(s→s+1) is met but s<AS is not met, setting the Time as 0, and performing the step 3.2); and if CL(1s)≥CL(s→s+1) is not met, performing next step; and 3.4) if CL(1s)<CL(s→s−1) is met, adding 1 to the counter Time, otherwise setting the Time as 0, and performing the step 3.2); if Time=5 and s>AS are met, setting the Time as 0, performing state transition, and taking the value of s as max(s−1,0), i.e., performing state transition when CL(1s)<CL(s→s−1) for five consecutive seconds and the current state s>AS are met at the same time; if Time=5 is met but s>AS is not met, setting the Time as 0, and performing the step 3.2); and if Time=5 is not met, performing the step 3.2);

(4) periodically broadcasting a Cooperative Awareness Messages (CAM): wherein the vehicle node sets the corresponding transmit power, the corresponding transmit data rate and the corresponding receiver sensitivity according to the updated state value s, so as to adaptively adjust the broadcast range of CAM; and (5) transmitting a routing message: wherein the vehicle node sets the corresponding transmit power, the corresponding transmit data rate and the corresponding receiver sensitivity according to the updated state value s, so as to adaptively adjust the communication range of routing message, utilizes CAM to update state information of the neighbor nodes in real time, combines Greedy Perimeter Stateless Routing (GPSR), adopts unicast multi-hop opportunistic routing based on geographic information, selects neighbor nodes closer to a target node as relay nodes for next hop to perform greedy forwarding, and adopts opportunistic forwarding when falling into local optimum.

Compared with prior art, the present invention has the following advantages.

(1) Due to the design of the multi-state machine combining transmit power, transmit data rate and receiver sensitivity, the present invention uses a fair multi-state decentralized congestion control method, overcomes the defect of poor performance of IEEE 802.11p MAC under severe channel load, can adaptively adjust the broadcast range of CAM and the communication range of routing message, effectively performs congestion control, improves the reception ratio of periodic safety information and the delivery ratio of routing message while providing fair channel allocation and access, and realizes reliable transmission.

(2) Due to the use of the cross-layer opportunistic routing method based on geographic information, the present invention combines CAM assistance and GPSR routing decision, overcomes the problems of congestion and poor real-time performance of information caused by auxiliary information transmission in the prior art, effectively performs congestion control and real-time interaction of information, and improves the delivery ratio of routing message under different traffic densities.

DETAILED DESCRIPTION

The embodiments of the invention are described in detail below with reference to the accompanying drawings, but the implementation and protection of the invention are not limited to the embodiments.

Figure 1:
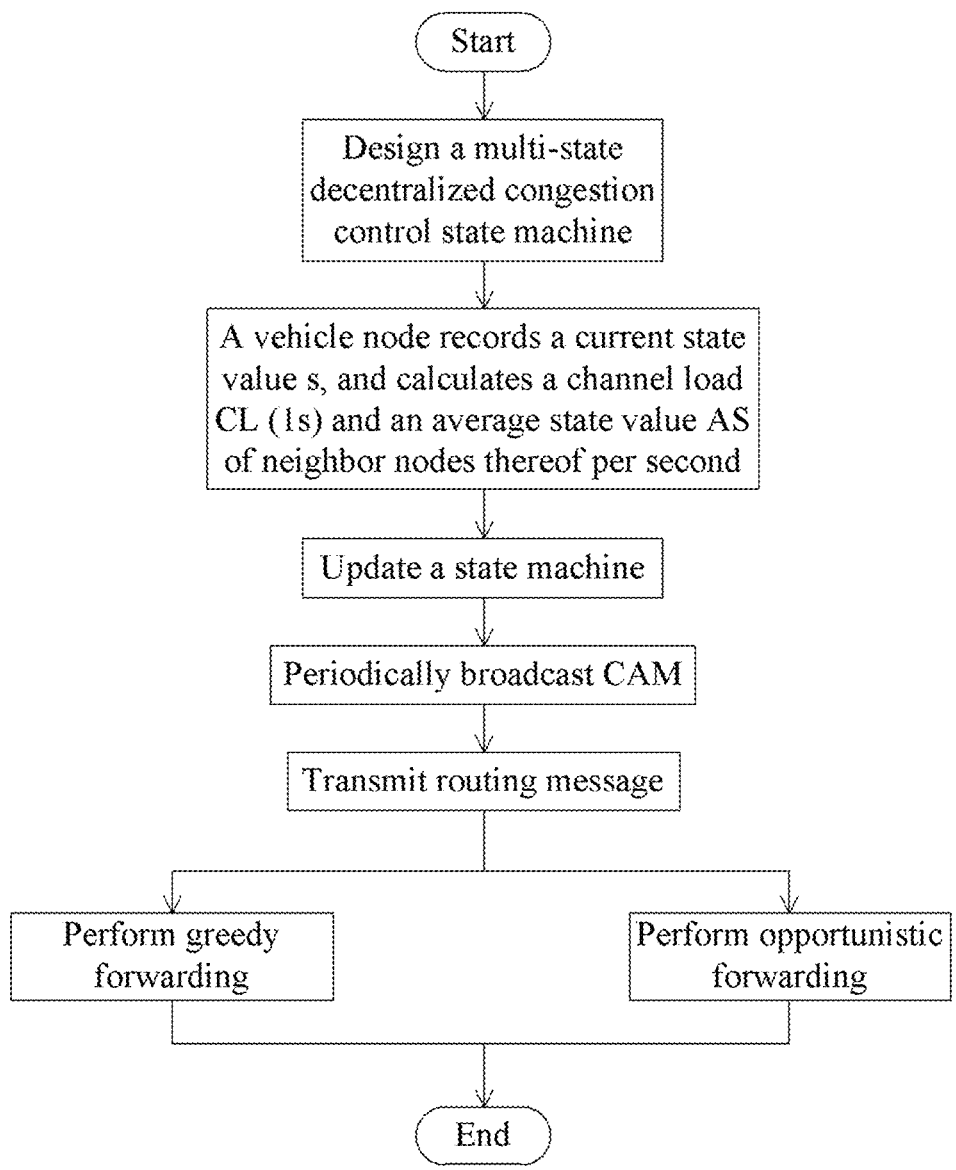
FIG. 1 is an overall flow chart of the present invention.

With reference to FIG. 1, a method of cross-layer opportunistic routing for VANET based on decentralized congestion control strategy according to the embodiment is realized by the following steps.

In step 1, a multi-state decentralized congestion control state machine is designed.

Figure 2:
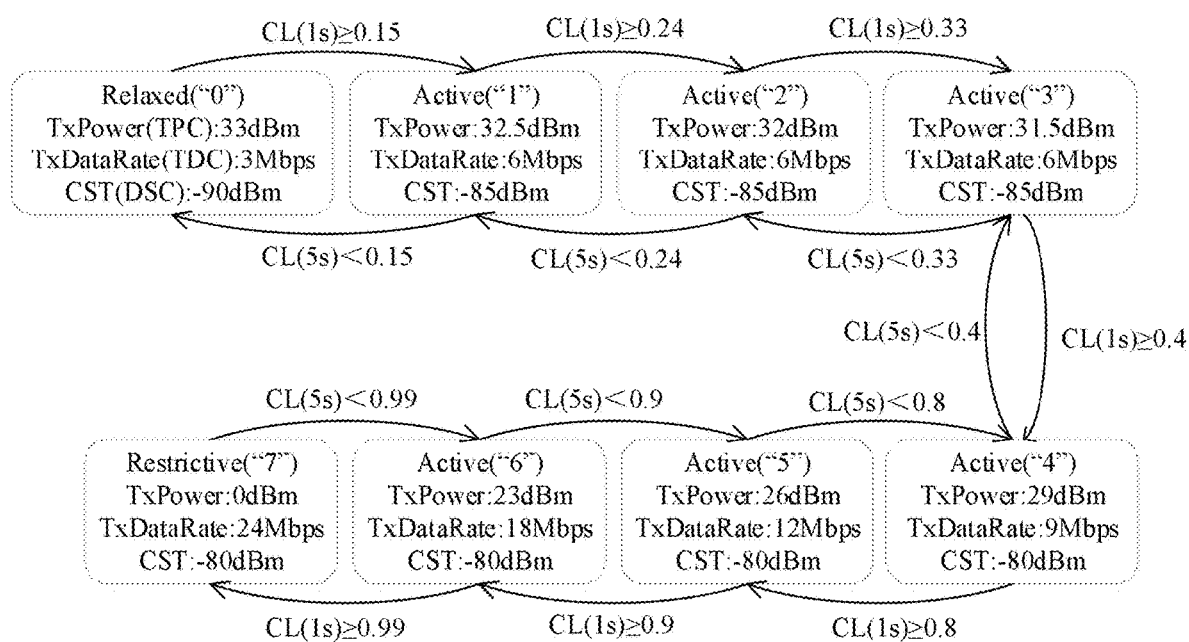
FIG. 2 is a design diagram of a multi-state decentralized congestion control state machine in an embodiment.

With reference to FIG. 2, the multi-state decentralized congestion control state machine has eight states (s), which are recorded as Relaxed ("0"), Active("1"), Active("2"), Active("3"), Active("4"), Active("5"), Active("6") and Restrictive ("7") in sequence, state values are 0 to 7, a transmit power TxPower(TPC), a transmit data rate TxDataRate(TDC) and a receiver sensitivity CST(DSC) are correspondingly set for each state, the higher the state value is, the lower the transmit power and the receiver sensitivity are, and the higher the transmit data rate is.

In step 2, a current state value s (s=0 during initialization) is recorded by a vehicle node, and a channel load CL (1s) of a medium access control layer (MAC layer) and an average state value AS of all neighbor nodes thereof are calculated at a time interval period of 1 s. The channel load CL is specified as the fraction of a time that a received power P is above carrier sensing threshold CST, if a probe interval Tp=10 μs is set, and a number of probes in one second is that Np=1 s/Tp, then the statistical value of CL is:

$$CL(CST) = \frac{\sum_{i=1}^{N_p} \overline{P_i}}{N_p}$$

wherein $P_i$ denotes a received power at $i^{th}$ moment, and if $P_i$>CST, then $\overline{P_i}$=1, otherwise $\overline{P_i}$=0.

The average state value AS of the neighbor nodes thereof is calculated by the following steps of:

2.1) carrying, by each vehicle, current state value information thereof in periodically broadcasted safety information; and 2.2) collecting, by the vehicle node, state values of the safety information received, and calculating the average state value AS of all the neighbor nodes (comprising the vehicle node).

In step 3, the state machine is updated by the vehicle node according to the CL (1 s), the s and the AS.

Figure 3:
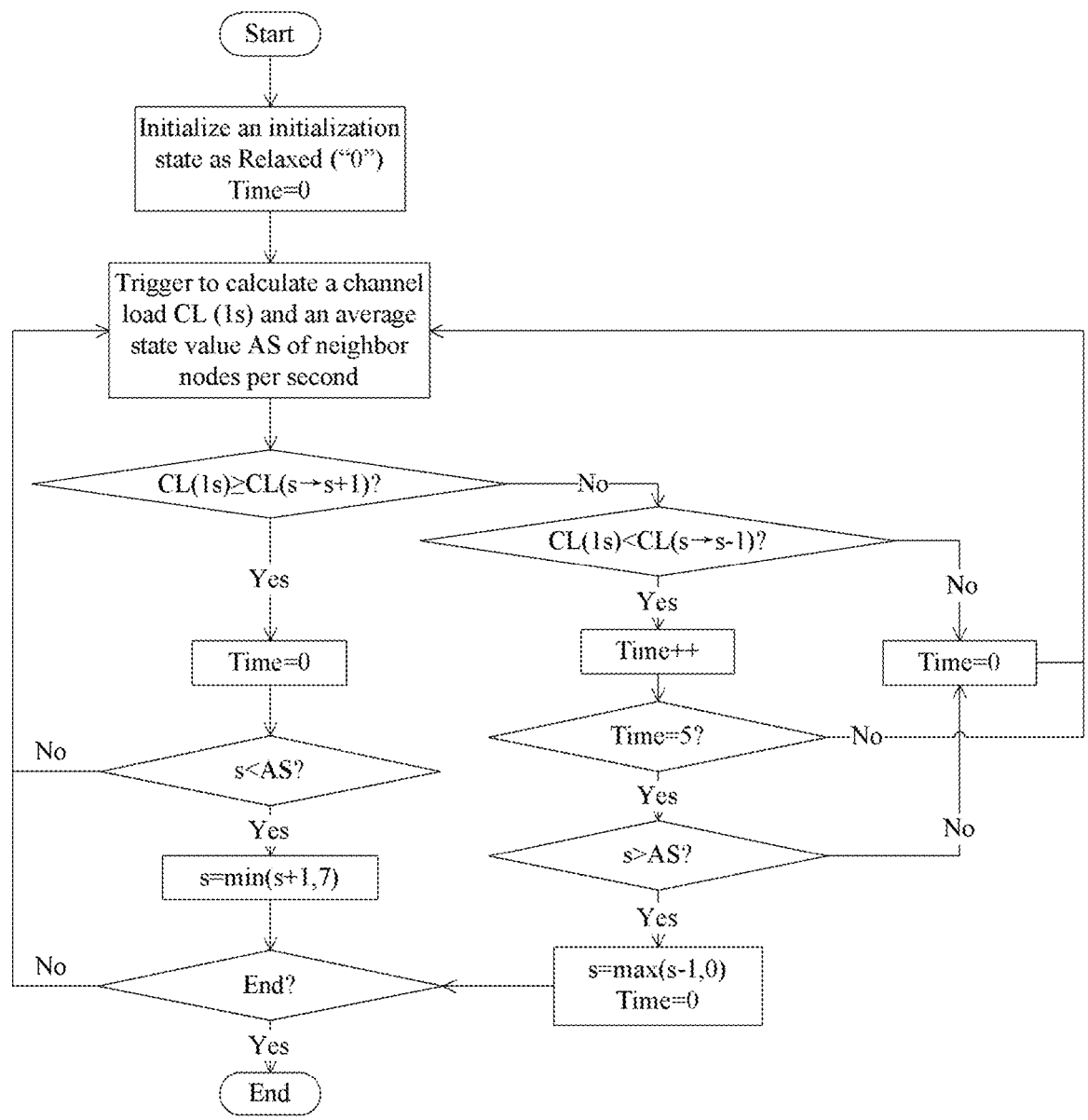
FIG. 3 is a sub-flow diagram illustrating updating of the state machine in the present invention.

With reference to FIG. 3, the step is specifically realized as follows:

CL(s→s+1) denotes a channel load threshold in a transition condition from the state s to a state s+1, CL(s→s−1) denotes a channel load threshold in a transition condition from the state s to a state s−1, min(s,k) denotes the minimum value of s and k, max(s,k) denotes the maximum value of s and k, and a counter Time is initialized as 0;

3.1) the state of the state machine is initialized as Relaxed ("0"), and the counter Time is initialized as 0;

3.2) calculation of the channel load CL (1 s) and the average state value AS is triggered per second, and the current state value s is recorded;

3.3) if CL(1s)≥CL(s→s+1) and s>AS are both met at the same time, the Time is set as 0, state transition is performed, and the value of s is taken as min(s+1,7); if CL(1 s)≥CL(s→s+1) is met but s<AS is not met, the Time is set as 0, and the step 3.2) is performed; and if CL(1 s)≥CL(s→s+1) is not met, next step is performed; and 3.4) if CL(1 s)<CL(s→s−1) is met, 1 is added to the counter Time, otherwise the Time is set as 0, and the step 3.2) is performed; if Time=5 and s>AS are met, the Time is set as 0, state transition is performed, and the value of s is taken as max(s−1,0), i.e., state transition is performed when CL(1 s)<CL(s→s−1) for five consecutive seconds and the current state s>AS are met at the same time; if Time=5 is met but s>AS is not met, the Time is set as 0, and the step 3.2) is performed; and if Time=5 is not met, the step 3.2) is performed.

In step 4, CAM is periodically broadcasted.

The vehicle node sets the corresponding transmit power, the corresponding transmit data rate and the corresponding receiver sensitivity according to the updated state value s, so as to adaptively adjust the broadcast range of CAM.

In step 5, routing message is transmitted.

The vehicle node sets the corresponding transmit power, the corresponding transmit data rate and the corresponding receiver sensitivity according to the updated state value s, so as to adaptively adjust the communication range of routing message, utilizes CAM obtained in the step 4 to update state information of the neighbor nodes in real time, combines Greedy Perimeter Stateless Routing (GPSR), adopts unicast multi-hop opportunistic routing based on geographic information, selects neighbor nodes closer to a target node as relay nodes for next hop to perform greedy forwarding, and adopts opportunistic forwarding when falling into local optimum.

Figure 4:
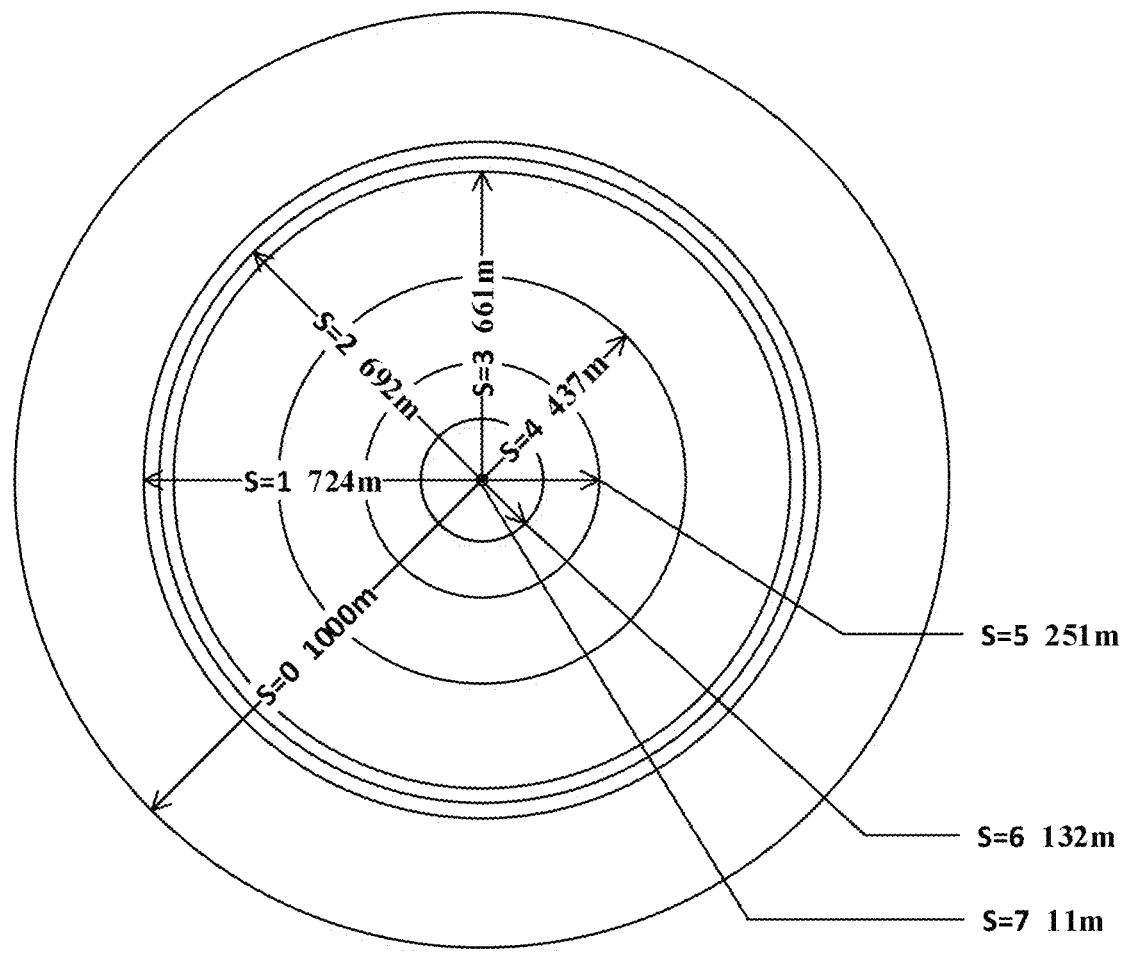
FIG. 4 is a sample diagram illustrating estimation of a communication range in the embodiment.

An estimation formula for adaptively adjusting the broadcast range of CAM and the communication range CR of routing message is as follows:

$$CR = \max CsRange \times 10^{\frac{33-txPower+rxPower-DCS+\Delta SNR(datarate)}{10 \times refPathloss}}$$

wherein txPower is the transmit power, datarate is the transmit data rate, $\Delta SNR(datarate)$ is a signal-to-noise ratio backoff corresponding to datarate; with reference to Table 1, which shows values of the signal-to-noise ratio backoff $\Delta SNR$ of the present invention, rxPower is a received power, DCS is a default value of the receiver sensitivity, when rxPower is equal to DCS, a farthest communication range is reached, i.e., rxPower−DCS=0, maxCsRange is a maximum carrier sensing range, the default value is 1000 m, refPathloss is a reference pathloss parameter, and the default value is 2.5. FIG. 4 shows estimation of the corresponding communication range of different state values s, when s=0, the communication range is estimated to be 1000 m, when s=1, the communication range is estimated to be 724 m, and so on.

TABLE 1

| Modulation and coding strategy | datarate(Mbit/s) | $\Delta SNR(dB)$ |
| --- | --- | --- |
| 0 | 3 | 0 |
| 1 | 4.5 | 1 |
| 2 | 6 | 3 |
| 3 | 9 | 5 |
| 4 | 12 | 8 |
| 5 | 18 | 12 |
| 6 | 24 | 16 |
| 7 | 27 | 17 |

TABLE 2

| Simulation parameter | Simulation value |
| --- | --- |
| Scene size and overall path length | 2 km × 2 km, 20 km |
| Mobile scene model | Manhattan Grid model |
| Transmission loss model | Two Ray Ground |
| Number of vehicles, average rate and maximum rate | 100 to 1500, 15 m/s, and 20 m/s |
| Packet size, transmit frequency and transmit data rate of safety messages | 200 bytes, 10 Hz, and 3 Mbps to 24 Mbps |
| Packet size, transmit frequency and default data rate of routing message | 64 bytes, 1 Hz, and 2048 bps |
| Working frequency | 5.9 GHz |
| MAC type | 802.11p, and DCC |

TABLE 2-continued

| Simulation parameter | Simulation value |
| --- | --- |
| Stimulation time | 100 s |
| Routing protocols | GPSR, GPSR + DCC(3), and the method of the invention |

Figure 5:
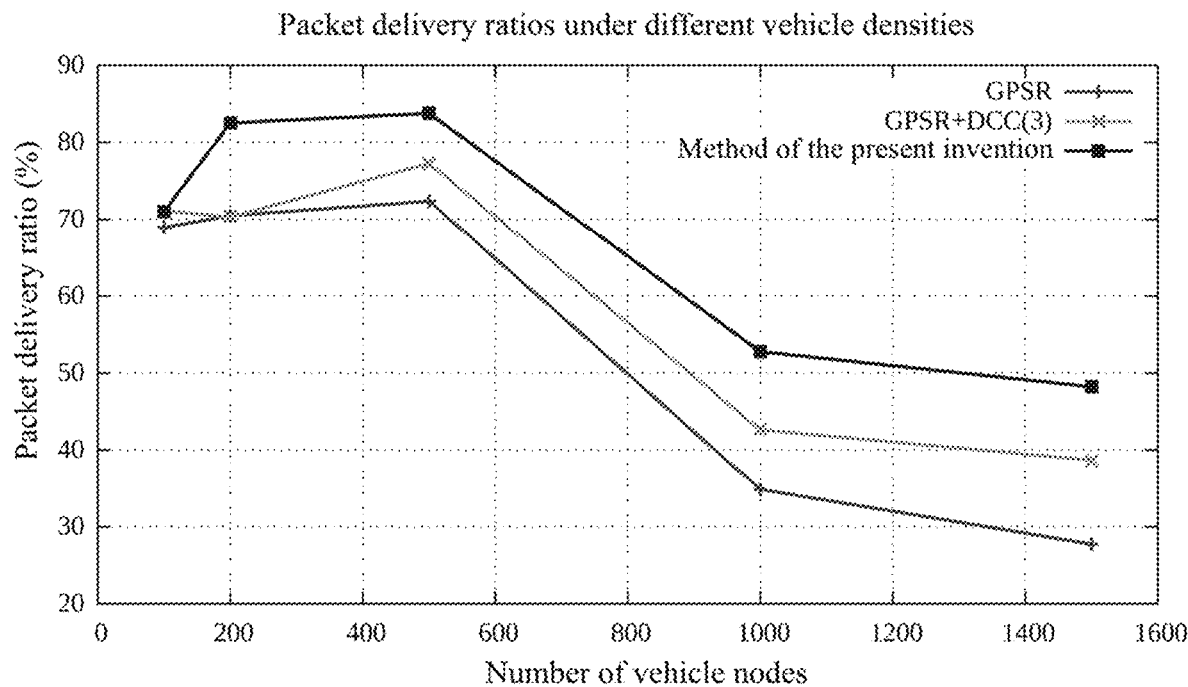
FIG. 5 is a comparison diagram of packet delivery ratio of the embodiment and existing routing methods.
Figure 6:
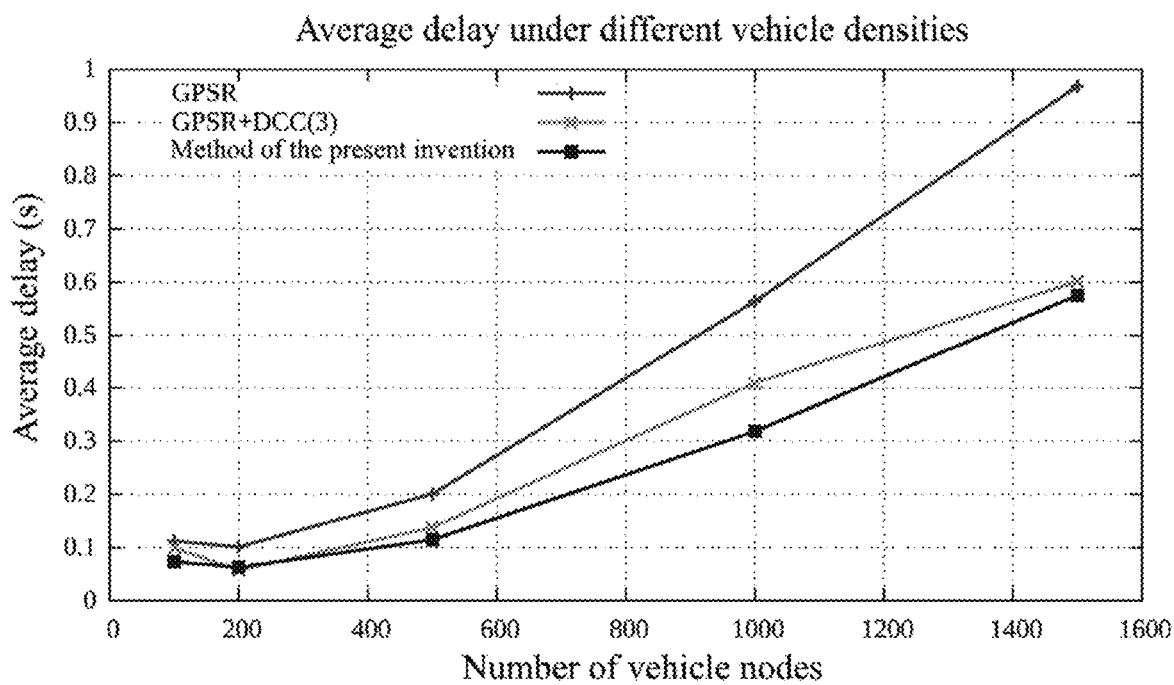
FIG. 6 is a comparison diagram of average delay of the embodiment and existing routing methods.

The experimental parameter setting is shown in Table 2, which is the experimental parameter setting in the embodiment; and the experimental results obtained according to the step above are shown in FIG. 5 and FIG. 6.

FIG. 5 shows the packet delivery ratio under different vehicle densities (100 to 1500 vehicle nodes). It can be seen from FIG. 5 that compared with the traditional routing method, the cross-layer opportunistic routing method used in the present invention can effectively improve the packet delivery ratio of routing message and improve the routing performance.

FIG. 6 shows the average delay under different vehicle densities (100 to 1500 vehicle nodes). It can be seen from FIG. 6 that compared with the traditional routing method, the cross-layer opportunistic routing method used in the present invention can effectively reduce the average delay of routing message and improve the routing performance.

What is claimed is:

1. A method of cross-layer opportunistic routing for Internet of Vehicles based on decentralized congestion control strategy, comprising:

(1) designing a multi-state decentralized congestion control state machine: wherein the multi-state decentralized congestion control state machine has eight states (s), which are recorded as Relaxed ("0"), Active ("1 to 6") and Restrictive ("7") in sequence, state values are 0 to 7, a transmit power, a transmit data rate and a receiver sensitivity are set for each state, the higher the state value is, the lower the transmit power and the receiver sensitivity are, and the higher the transmit data rate is;

(2) recording, by a vehicle node, a current state value s, wherein s=0 during initialization, and calculating a channel load (CL) of a Medium Access Control layer, i.e. a MAC layer, and an average state value AS of all neighbor nodes thereof at a time interval period of 1 s;

(3) updating, by the vehicle node, the state machine according to the CL (1s), the s and the AS:

wherein CL(s→s+1) denotes a channel load threshold in a transition condition from the state s to a state s+1, CL(s→s−1) denotes a channel load threshold in a transition condition from the state s to a state s−1, min(s,k) denotes the minimum value of s and k, and max(s,k) denotes the maximum value of s and k;

3.1) initializing the state machine as Relaxed ("0"), and a counter Time as 0;

3.2) triggering to calculate the channel load CL (1s) and the average state value AS per second, and recording the current state value s;

3.3) if CL(1s)≥CL(s→s+1) and s<AS are both met at the same time, setting the Time as 0, performing state transition, and taking the value of s as min(s+1,7); if CL(1s)≥CL(s→s+1) is met but s<AS is not met, setting the Time as 0, and performing the step 3.2); and if CL(1s)≥CL(s→s+1) is not met, performing next step; and 3.4) if CL(1s)<CL(s→s−1) is met, adding 1 to the counter Time, otherwise setting the Time as 0, and performing the step 3.2); if Time=5 and s>AS are met, setting the Time as 0, performing state transition, and taking the value of s as max(s−1,0), i.e., performing state transition when CL(1s)<CL(s→s−1) for five consecutive seconds and the current state s>AS are met at the same time; if Time=5 is met but s>AS is not met, setting the Time as 0, and performing the step 3.2); and if Time=5 is not met, performing the step 3.2);

(4) periodically broadcasting a Cooperative Awareness Messages (CAM): wherein the vehicle node sets the corresponding transmit power, the corresponding transmit data rate and the corresponding receiver sensitivity according to the updated state value s, so as to adaptively adjust the broadcast range of the CAM; and (5) transmitting a routing message: wherein the vehicle node sets the corresponding transmit power, the corresponding transmit data rate and the corresponding receiver sensitivity according to the updated state value s, so as to adaptively adjust the communication range (CR) of the routing message, utilizes the CAM to update state information of the neighbor nodes in real time, combines Greedy Perimeter Stateless Routing (GPSR), adopts unicast multi-hop opportunistic routing based on geographic information, selects neighbor nodes closer to a target node as relay nodes for next hop to perform greedy forwarding, and adopts opportunistic forwarding when falling into local optimum.

2. The method of cross-layer opportunistic routing for Internet of Vehicles based on decentralized congestion control strategy according to claim 1, wherein the channel load (CL) in the step (2) is specified as the fraction of a time that the received power P is above carrier sensing threshold (CST), if a probe interval Tp=10 µs is set, and a number of probes in one second is that Np=1 s/Tp, then the statistical value of CL is:

$$CL(CST) = \frac{\sum_{i=1}^{N_P} \overline{P_i}}{N_p}$$

wherein $P_i$ denotes a received power at $i^{th}$ moment, and if $P_i$>CST, then $\overline{P_i}$=1; otherwise $\overline{P_i}$=0.

3. The method of cross-layer opportunistic routing for Internet of Vehicles based on decentralized congestion control strategy according to claim 1, wherein the calculating, by the vehicle node, the average state value AS of all the neighbor nodes thereof in the step (2) comprises the following steps of:

2.1) carrying, by each vehicle, current state value information thereof in periodically broadcasted safety information; and 2.2) collecting, by the vehicle node, state values of the safety information received, and calculating the average state value AS of the vehicle node and all the neighbor nodes.

4. The method of cross-layer opportunistic routing for Internet of Vehicles based on decentralized congestion control strategy according to claim 1, wherein an estimation formula for adaptively adjusting the broadcast range of CAM and the communication range (CR) of routing message in the step (4) and the step (5) is as follows:

$$CR = maxCsRange \times 10^{\frac{33-txPower+rxPower-DCS+\Delta SNR(datarate)}{10 \times refPathloss}}$$

wherein txPower is the transmit power, datarate is the transmit data rate, $\Delta$SNR(datarate) is a signal-to-noise ratio backoff value corresponding to datarate, rxPower is a received power, DCS is a default value of the receiver sensitivity, when rxPower is equal to DCS, a farthest communication range is reached, maxCsRange is a maximum carrier sensing range, and refPathloss is a reference pathloss parameter.

* * * * *